(12) United States Patent
Hettle et al.

(10) Patent No.: US 9,630,460 B2
(45) Date of Patent: Apr. 25, 2017

(54) FORMED FLANGE FOR PRESSURE MONITORING VALVE STEM MOUNT

(71) Applicant: Continental Automotive Systems US, Inc., Auburn Hills, MI (US)

(72) Inventors: Michael Hettle, Onsted, MI (US); Jean-Christophe Deniau, Fenton, MI (US); Franz Hillenmayer, Burglengenfeld (DE); Christian Kempf, Toulouse (FR); Francois Gory, TourneFeuille (FR)

(73) Assignee: Continental Automotive Systems, Inc., Auburn Hills, MI (US)

(*) Notice: Subject to any disclaimer, the term of this patent is extended or adjusted under 35 U.S.C. 154(b) by 0 days.

(21) Appl. No.: 14/010,307

(22) Filed: Aug. 26, 2013

(65) Prior Publication Data

US 2013/0340516 A1   Dec. 26, 2013

Related U.S. Application Data

(63) Continuation of application No. 12/133,693, filed on Jun. 5, 2008, now abandoned.

(60) Provisional application No. 60/967,113, filed on Aug. 31, 2007, provisional application No. 60/937,410, filed on Jun. 27, 2007, provisional application No. 60/933,378, filed on Jun. 5, 2007.

(51) Int. Cl.
*B60C 23/04* (2006.01)
*B60C 29/02* (2006.01)

(52) U.S. Cl.
CPC ...... *B60C 23/0491* (2013.01); *B60C 23/0408* (2013.01); *B60C 23/0494* (2013.01); *B60C 29/02* (2013.01); *Y10T 137/0491* (2015.04); *Y10T 137/3662* (2015.04)

(58) Field of Classification Search
CPC ............ B60C 23/0494; B60C 23/0498; B60C 23/0408; B60C 23/0491; B60C 29/02; Y10T 137/0491; Y10T 137/3662
USPC ........... 137/557, 797; 73/146.3, 146.5, 146.8
See application file for complete search history.

(56) References Cited

U.S. PATENT DOCUMENTS

| | | | |
|---|---|---|---|
| 2,872,963 A * | 2/1959 | Boyer | ...................... B60C 29/02 152/427 |
| 3,838,499 A | 10/1974 | Fuller | |
| 4,016,918 A | 4/1977 | Thacker | |
| 4,134,102 A | 1/1979 | Stewart et al. | |
| 4,760,860 A | 8/1988 | Madrona | |
| 4,826,379 A | 5/1989 | Norden | |
| 5,027,848 A | 7/1991 | Leeuwen | |
| 5,439,276 A | 8/1995 | Jerina et al. | |

(Continued)

FOREIGN PATENT DOCUMENTS

KR    100800517 B1 *   2/2008
KR    20120109806 A *  10/2012

OTHER PUBLICATIONS

International Preliminary Report on Patentability mailed Dec. 17, 2009 Application No. PCT/US2008/065871.

(Continued)

*Primary Examiner* — Kevin Murphy
*Assistant Examiner* — Jonathan Waddy

(57) ABSTRACT

A valve stem for mounting and supporting a tire pressure monitoring assembly includes a flange formed after insertion into the wheel rim for preventing movement caused by forces generated during wheel rotation.

3 Claims, 5 Drawing Sheets

(56) References Cited

U.S. PATENT DOCUMENTS

| | | |
|---|---|---|
| 5,844,131 A | 12/1998 | Gabelmann et al. |
| 6,163,255 A | 12/2000 | Banzhof et al. |
| 6,341,917 B1 | 1/2002 | Schubring et al. |
| 6,462,650 B1* | 10/2002 | Balzer et al. ................ 340/442 |
| 6,591,672 B2* | 7/2003 | Chuang et al. ............. 73/146.8 |
| 6,722,409 B1 | 4/2004 | Martin |
| 6,739,187 B2 | 5/2004 | Luce |
| 6,851,308 B2 | 2/2005 | Fonteneau |
| 6,865,932 B2* | 3/2005 | Luce ............................ 73/146.8 |
| 6,904,795 B1* | 6/2005 | Uleski ................ B60C 23/0408 |
| | | 73/146 |
| 6,952,957 B2* | 10/2005 | Kayukawa .................. 73/146.8 |
| 6,990,722 B2 | 1/2006 | Reid |
| 7,021,133 B1* | 4/2006 | Hsu .............................. 73/146.8 |
| 7,145,443 B2* | 12/2006 | Ito et al. ....................... 340/442 |
| 7,185,535 B2* | 3/2007 | Beckley et al. ............ 73/146.8 |
| 7,275,427 B1* | 10/2007 | Martin ............................ 73/146 |
| 7,395,702 B2* | 7/2008 | Qiu et al. .................... 73/146.8 |
| 7,587,935 B2 | 9/2009 | Kempf et al. |
| 7,669,466 B2* | 3/2010 | Ray et al. .................... 73/146.8 |
| 7,694,557 B2 | 4/2010 | Hettle et al. |
| 8,327,700 B2* | 12/2012 | Nagora et al. .............. 73/146.8 |
| 8,381,580 B2* | 2/2013 | Chuang et al. ............. 73/146.8 |
| 8,474,475 B2* | 7/2013 | Palaoro et al. ............... 137/227 |
| 8,490,479 B2* | 7/2013 | Cazzanti et al. ............ 73/146.2 |
| 2005/0087007 A1* | 4/2005 | Uleski ............................ 73/146 |
| 2006/0021426 A1* | 2/2006 | Pozzi ........................... 73/146.8 |
| 2006/0272758 A1* | 12/2006 | Yin et al. ....................... 152/427 |
| 2007/0113637 A1 | 5/2007 | Blossfeld |
| 2008/0202659 A1 | 8/2008 | Hettle et al. |
| 2008/0209711 A1 | 9/2008 | Gory |

OTHER PUBLICATIONS

International Search Report and Written Opinion mailed on Aug. 26, 2008 Application No. PCT/US2008/065871.

* cited by examiner

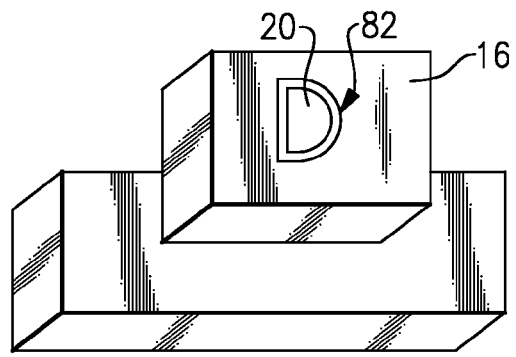
FIG.8
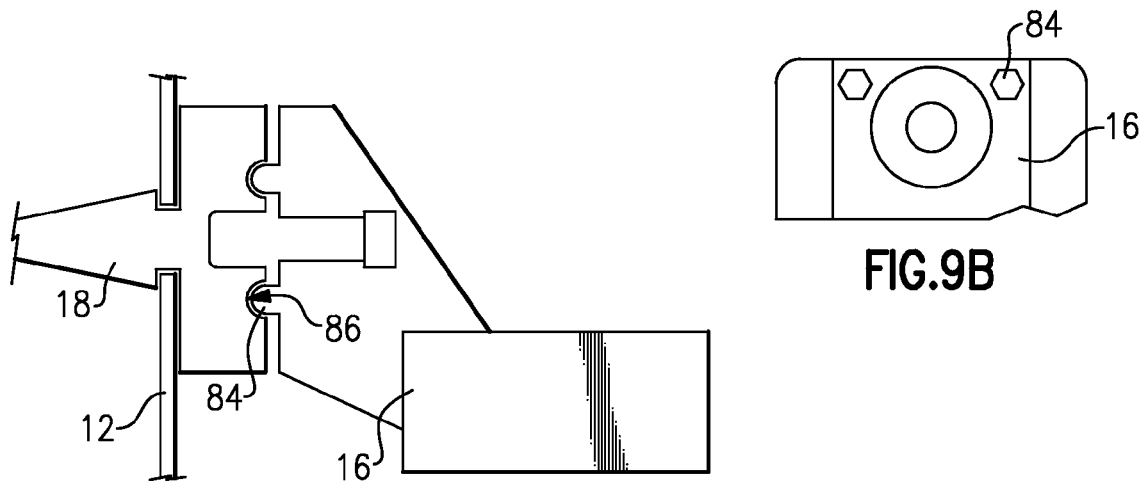
FIG.9A
FIG.9B
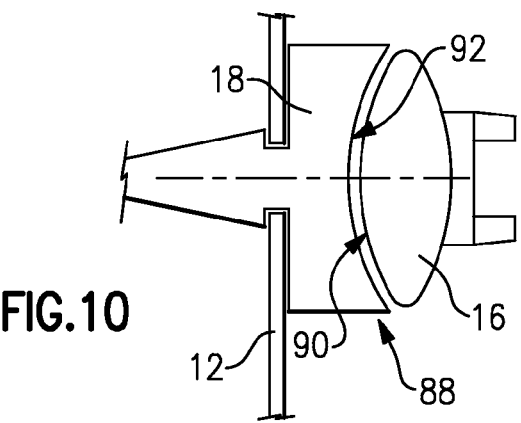
FIG.10

FORMED FLANGE FOR PRESSURE MONITORING VALVE STEM MOUNT

CROSS REFERENCE TO RELATED APPLICATION

The application claims priority to U.S. application Ser. No. 12/133,693 that in turn claims priority to U.S. Provisional Application Nos. 60/967,113, filed Aug. 31, 2007; 60/937,410, filed Jun. 27, 2007; and 60/933,378 filed on Jun. 5, 2007.

BACKGROUND OF THE INVENTION

A disclosed example valve stem includes a deformable housing for securement within a wheel rim. More particularly, the disclosed example valve stem includes features for securing a valve stem supporting a tire pressure monitoring sensor within a wheel rim.

Tire pressure monitoring sensors can be secured within a wheel rim to a valve stem. A conventional valve stem is received within an opening of the wheel rim and secured therein by an elastically deformable rubber housing. Disadvantageously, the weight added by a tire pressure monitoring device attached to the valve stem can cause undesired deformation during rotation of the wheel rim. Centrifugal forces acting on the tire pressure monitoring device can be transmitted back to the rubber housing and cause deformation that in turn disrupts the desired air tight seal with the wheel rim.

Accordingly, it is desirable to design and develop a method and device for securing a tire pressure monitoring device to a valve stem that does not result in loss of the desired seal.

SUMMARY OF THE INVENTION

An example valve stem for mounting and supporting a tire pressure monitoring assembly includes a flange formed after insertion into the wheel rim for preventing movement caused by forces generated during wheel rotation.

An example tire pressure monitoring (TPM) assembly is mounted to a valve stem received within an opening of the wheel rim. The valve stem includes an inner portion disposed within the rim and an outer portion that extends outward from the rim. A valve body is disposed within the valve stem and provides an air passage through the rim for filling the tire. The valve stem includes the inner portion that abuts an inner surface of the rim. A flange is formed in the valve stem to expand against an outer surface of the wheel rim. In one disclosed example, a screw extends though the housing and engages internal threads formed in the valve body. Tightening of the thread pulls the valve body inwardly to cause deformation of the valve stem to form a flange abutting the outer surface of the wheel rim.

In another disclosed example, the valve body includes external threads on a portion that extends through the sensor body. A nut is then either pushed or threaded on to provide the desired deformation of the valve stem to form the desired formed flange that secures the valve stem to the wheel rim. Accordingly, the example valve stem flange formed TPM assemblies provide a robust valve stem wheel rim interface that prevents leakage caused by force generated by rotation of the wheel rim.

These and other features of the present invention can be best understood from the following specification and drawings, the following of which is a brief description.

BRIEF DESCRIPTION OF THE DRAWINGS

FIG. 8 is a schematic view of an example anti-rotation feature.

FIG. 9A is another schematic view of another example anti-rotation feature.

FIG. 9B is a schematic view of a front side of a sensor housing.

FIG. 10 is a schematic view of yet another example anti-rotation feature.

DETAILED DESCRIPTION OF THE PREFERRED EMBODIMENT

Figure 1:
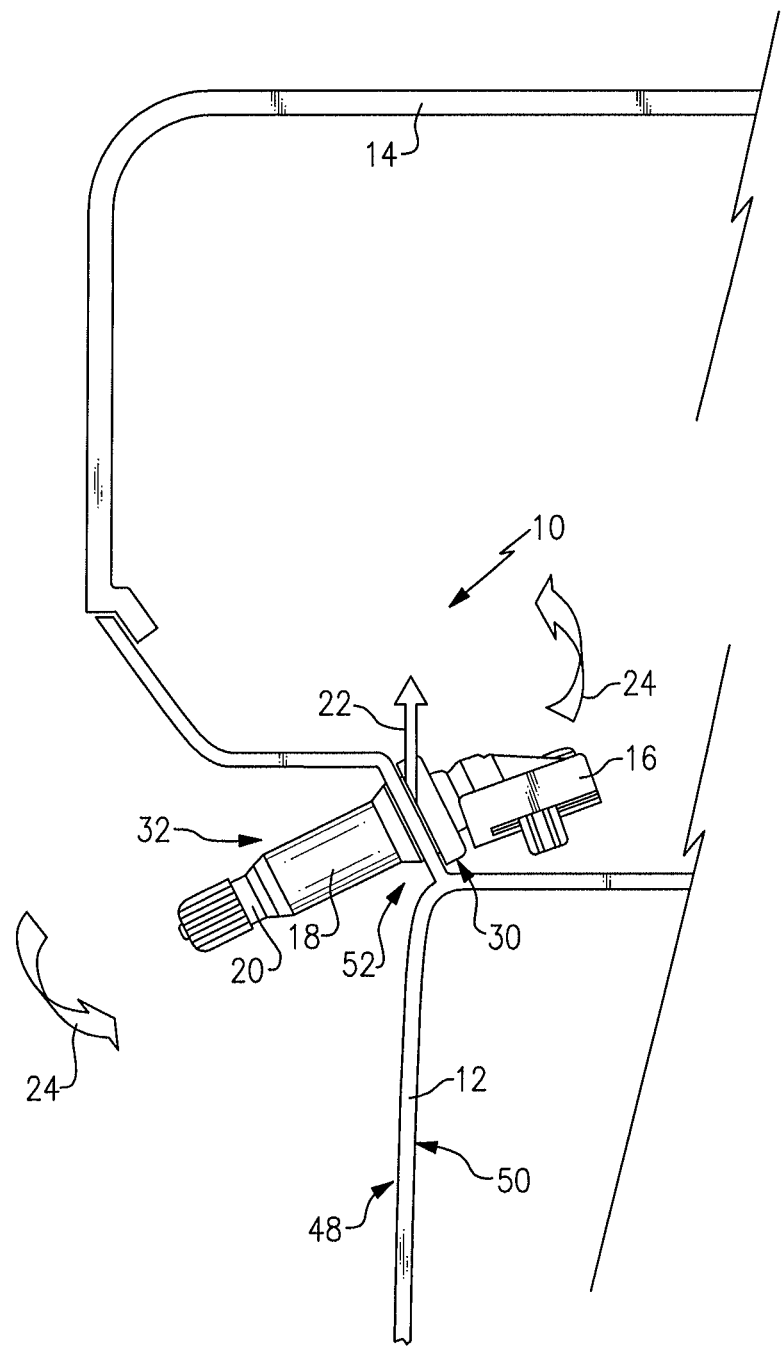
FIG. 1 is a schematic view of an example tire pressure monitoring assembly mounted within a wheel.

Referring to FIG. 1 a tire pressure monitoring sensor (TPM) assembly 10 is mounted to a wheel rim 12. The rim 12 supports a tire 14 and the TPM assembly 10 includes a sensor housing 16 that includes a sensor and a transmitter for measuring and communicating conditions within the tire 14.

The TPM assembly 10 includes a valve stem 18 comprised of an elastic material such as for example rubber. The valve stem 18 includes an inner portion 30 disposed within the rim 12 and outer portion 32 that extends outward from the rim 12 and cavity 34 extending from the inner portion 30 to the outer portion 32. A valve body 20 is disposed within the valve stem 18 and provides an air passage through the rim 12 for filling the tire 14.

The sensor housing 16 is supported within the rim 12 by the valve stem 18 and is susceptible to movement responsive to rotation. A centripetal force in a direction indicated at 22 is generated by rotation of the rim 12. The force 22 is exerted on the sensor housing 16 that causes movement in a direction indicated by arrows 24. This twisting movement is not desirable and is substantially reduced and prevented by the disclosed TPM assembly 10 and mounting methods.

The valve stem 18 includes the inner portion 30 that abuts an inner surface 50 of the rim 12. A flange is formed in the valve stem 18 to expand against an outer surface 48 of the wheel rim 12.

Figure 2:
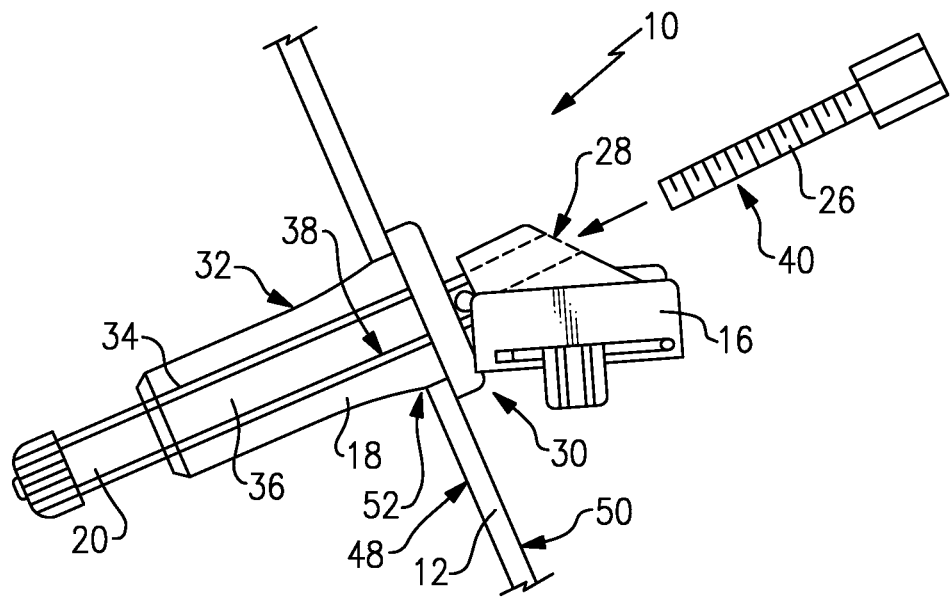
FIG. 2 is a schematic view of an example tire pressure monitoring assembly prior formation of the mounting flange.

Referring to FIG. 2, with continued reference to FIG. 1, the example TPM assembly 10 includes a screw 26 with threads 40. The valve body 20 defines the bore 36 and includes internal threads 38 that engage the threads 40 of the screw 26. The valve stem 18 is received through an opening 52 in the rim 12 such that the inner portion 30 abuts the inner surface 50. The outer portion 32 is a clearance to slight interference fit with the opening 52. The slight interference fit is such that the valve stem 18 will remain within the opening 52, but is not yet substantial enough to prevent forces generated during rotation from distorting a desired seal with the rim 12.

The housing 16 includes an opening 28 through which the screw 26 extends to engage the threads 38 of the valve body 20. The outer portion 32 of the valve stem 18 includes a thickness that provides for a desired flexibility and deformability. Tightening of the screw 26 within the valve body 20 pulls the valve body 20, and thereby the valve stem 18 toward the rim 12 to buckle and deform the outer portion 32 to form a flange against the outer surface 48 of the wheel rim 12.

Figure 3:
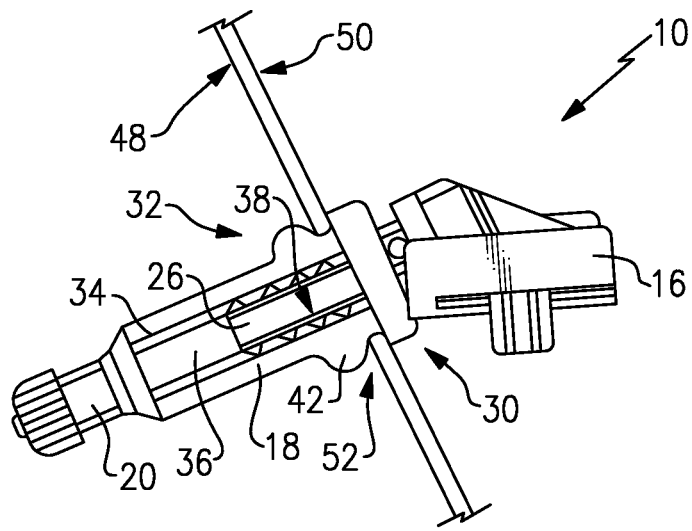
FIG. 3 is a schematic view of an example tire pressure monitoring assembly mounted within to a wheel rim.

Referring to FIG. 3 with continued reference to FIGS. 1 and 2, the screw 26 is engaged with the threads 38 of the valve body 20 and tightened to cause the outer portion 32 of the valve stem 18 to buckle and form a flange portion 42. The flange portion 42 secures the outer portion 32 against the outer surface of the wheel rim 12. The flange portion 42 comprises the buckled and deformed portion of the valve stem 18 caused by tightening and securing of the screw 26.

The elastic characteristics of the valve stem 18 creates a compression biasing force between the formed flange 42 and the inner portion 30 that counters forces generated during rotation of the wheel rim 12. Further, because the compression biasing forces are only exerted after the valve stem 18 is received within the opening 52, the compression forces holding the valve stem 18 can be much higher than if a flange is formed prior to insertion and required to be pushed through the opening 52. As appreciated, conventional valve stem mounting methods simply force the elastic valve stem 18 through the opening. Accordingly, the amount of force available for pushing the flange through the opening limits the size of the flange. In the disclosed method, because the flange 42 is formed after insertion through the opening 52, it can be larger and thereby provide a greater compression to hold the valve stem 18 in place.

Figure 4:
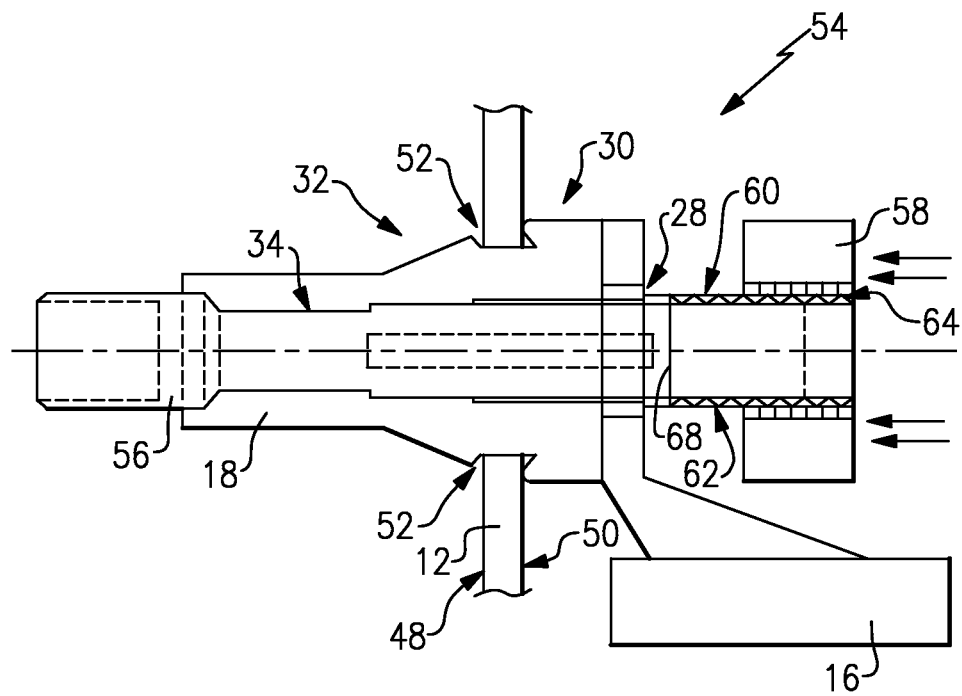
FIG. 4 is a schematic view of another example tire pressure monitoring assembly prior to formation of the mounting flange.
Figure 5:
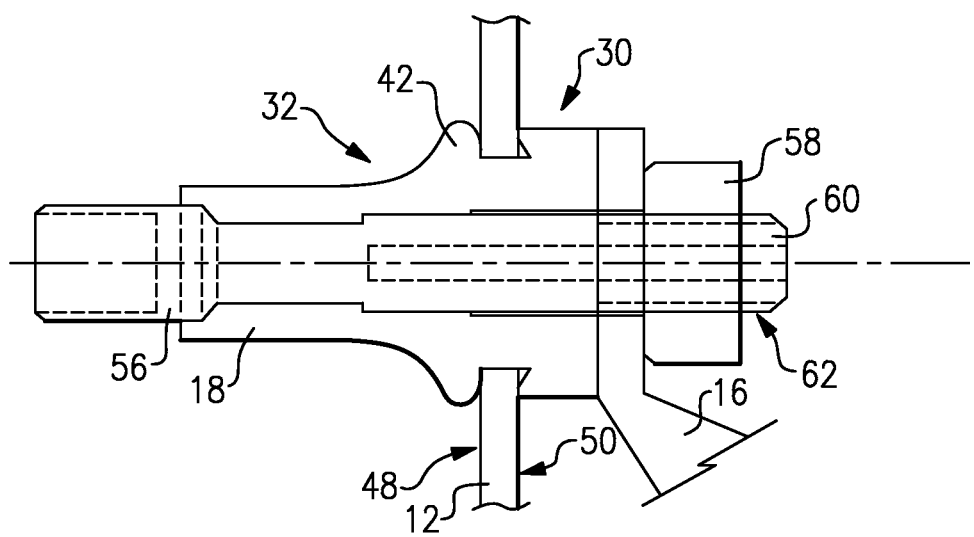
FIG. 5 is a schematic view of the example tire pressure monitoring assembly of FIG. 4 mounted to the wheel rim.

Referring to FIGS. 4 and 5, another TPM assembly 54 includes a valve body 56 that includes an inner portion 60 that extends outwardly from the valve stem 18. The inner portion 60 of the valve body 56 includes external threads 62. The sensor housing 16 includes an opening 28 through which the inner portion 60 extends. A nut 58 includes internal threads 64 that engage the threads 62. Tightening of the nut 58 secures the sensor housing 16 to the valve body 56.

Further tightening of the nut 58 causes deformation of the outer portion 32 of the valve stem 18 thereby forming the flange 42. The flange 42 comprises buckled material of the outer portion 32 that abuts against the outer surface 48 of the wheel rim 12. The flange 42 compresses against the wheel rim 12 to hold and secure the valve stem 18 in place. The increased compressive forces that are exerted and formed by tightening the nut 58 result in an improved seal that is substantially resistant to movements caused by rotation of the wheel.

The threads 62 are provided along a defined length such that the nut 58 can only be tightened a desired amount. Therefore, during installation, the nut 58 is tightened until reaching an end 68 of the threads. The end 68 of the threads corresponds to a tightened amount that provides a desired flange 42 and that also provides a desired compression against the wheel rim 12. The defined length of the threads provides a desired fit and substantially prevents over tightening.

Figure 6:
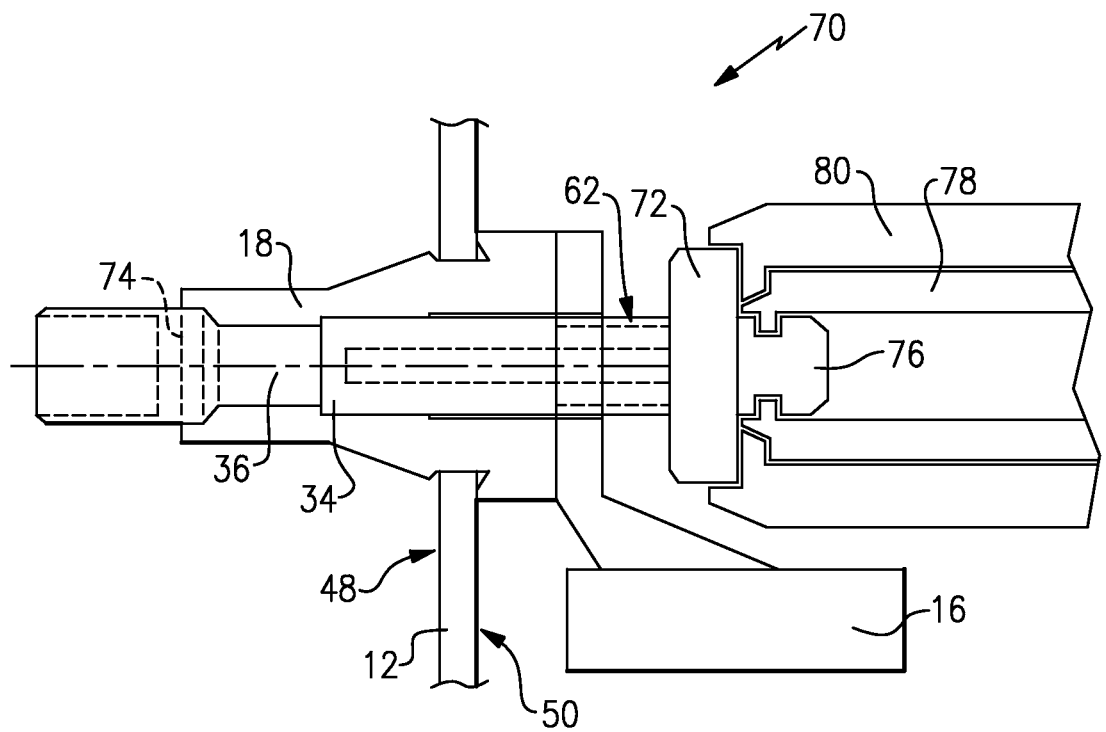
FIG. 6 is a schematic view of another tire pressure monitoring assembly including a push on nut.

Referring to FIG. 6, another example TPM assembly 70 includes the valves stem 18 with a valve body 74. The valve body 74 includes an inner portion 76. The inner portion 76 extends outwardly from the valve stem 18 and extends into an interior portion of the wheel rim 12. The inner portion 76 includes features 62 for engaging a push on nut 72. The example features 62 comprise threads configured to allow pushing on of the nut 72 and threading off for removal of the TPM assembly 70. The engagement features could also comprise barbs adapted to engage and secure the nut in a desired position.

Pushing of the nut 72 onto the valve body 74 causes the desired deformation of the outer portion 32 of the valve stem 18, thereby providing the desired compressive forces to hold the valve stem 18 within the opening 52.

Installation of the example TPM assembly 70 is accomplished with a clamping tool 78 and a pushing tool 80. Installation proceeds by initially inserting the valve stem 18 and valve body 74 through the opening 52 in the wheel rim 12. The amount of force required for this step is substantially reduced as compared to conventional methods because the outer flange is not yet formed.

The nut 72 can be pre-assembled to the valve body 74 to ease assembly operations. Once the valve stem 18 is disposed within the opening 52, the clamping tool 78 and pushing tool 80 can be engaged to the valve body 74 and the nut 72 respectively. As appreciated, is also within the contemplation of this invention that the clamping and pushing tool comprises a portion of the tool utilized to insert the valve stem 18 within the wheel rim 12. Further, other configuration as would be understood by a worker experienced in this field is also within the contemplation of this invention.

Figure 7:
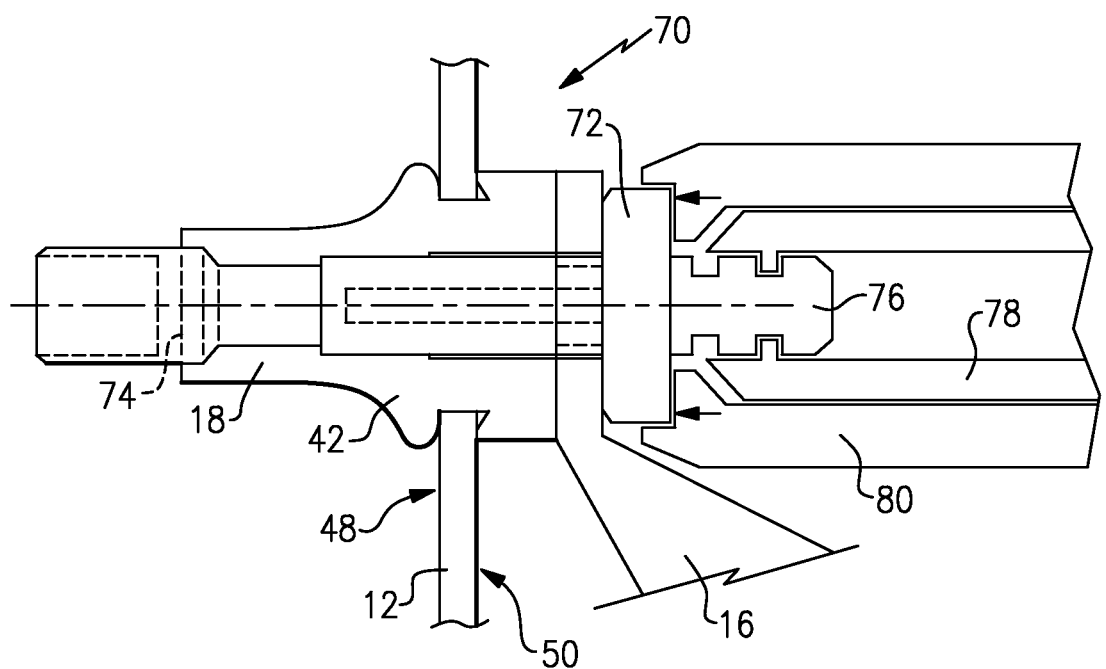
FIG. 7 is a schematic view of the tire pressure monitoring assembly of FIG. 6 mounted to the wheel rim.

Referring to FIG. 7, with continued reference to FIG. 6, installation is completed by concurrently pushing on the nut 72, and holding, or pulling on the valve body 74. The rear portion 76 of the valve body includes notch features that can be configured to break away under a desired load. Breaking way of the notch features on the rear portion 76 of the valve body provides a limit on the load that can be exerted by the nut 72. The resulting fit of the nut 72 against the housing 16 and the inner portion 30 of the valve stem 18 causes a buckling that forms the flange 42. The flange 42 is formed to abut against the outer surface 48 of the wheel rim 12. The compression provided by the nut 72 is maintained until the nut 72 is removed. The example nut 72 is pushed on and threaded off.

Referring to FIG. 8 and back to FIG. 2, a rear end view of the interface between the housing 16 and the valve body 20 of FIG. 2 is shown with an anti-rotational feature that includes the valve body 20 with a D-shaped cross-section 82 that corresponds with the opening 28. The keyed corresponding shapes of the valve body 20 and the sensor housing 16 substantially prevent relative rotation of the sensor housing 16 relative to the valve stem 18.

Referring to FIGS. 9A and 9B, another anti-rotation configuration include tabs 84 on the sensor housing 16 that engage corresponding indentations 86 within the valve stem 18. The tabs 84 engage the indentations 86 to provide a positive locating feature that prevents relative rotation between the valve stem 18 and the sensor housing 16.

Referring to FIG. 10, another anti-rotation interface between the valve stem 18 and the housing 16 include interlocking shapes 88 that prevent relative rotation. The example interlocking shapes 88 include a curved longitudinal surface 90 on the sensor housing 16 that fits within a concave portion 92 of the valve stem 18. The interlocking shapes 88 thereby prevent relative rotation between the valve stem 18 relative to the sensor housing 16. Further, the example interlocking features also facilitate an angular adjustment of the housing angle relative to the valve stem to accommodate various wheel rim angles with a single housing interface configuration. As is appreciated, the example interlocking shapes 88 can be reversed with the concave portion on the sensor housing 16 and the curved portion on the valve stem 18. Additionally, the interlocking shapes can include other configurations that provide and maintain a desired relative orientation.

Further, as the flange is formed by compression against the wheel rim, the frictional interface between the valve stem 18 and the wheel rim substantially prevent rotation of the valve stem 18 relative to the rim 12. Accordingly, the anti-rotation features that prevent rotation of the sensor housing 16 relative to the valve stem substantially prevent rotation of the entire TPM assembly 10. Further, the example valve stem flange formed TPM assemblies provide a robust valve stem wheel rim interface that prevents leakage caused by force generated by rotation of the wheel rim and retention of the sensor.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tire pressure monitoring assembly comprising:
   a valve stem, comprising an inner portion and an outer portion, the inner portion configured to be located inside a motor vehicle wheel rim, the outer portion configured to be located outside the motor vehicle wheel rim and having a segment, which is sized and shaped to extend through an opening in the motor vehicle wheel rim and have a clearance fit between said segment and said opening in the motor vehicle wheel rim, the outer portion being made from an elastically deformable material, which is selected to be capable of being deformed responsive to a compressive force applied to it;
   a valve body within the valve stem, the valve body providing an air passage that extends through the inner portion and through the outer portion of the valve stem, the air passage having internal threads, which are configured to receive a threaded screw;
   the threaded screw, comprising threads that engage the internal threads of the valve body air passage; and
   a sensor housing coupled to the air passage, the sensor housing having a through-hole, which is sized and shaped to allow the threaded screw to pass through it, the sensor housing being secured to the valve stem by the threaded screw;
   wherein a flange is formed by deformation of the elastically deformable material responsive to compressive force applied to the outer portion of said valve stem by engagement of the threaded screw to the valve body and tightening of the threads of the screw into the threads of the valve body, the compressive force pulling the valve body and outer portion toward the wheel rim, thereby buckling and deforming the elastically deformable material against the outer surface of the wheel rim, the flange, when formed, extending completely around the outer portion of the valve stem the flange providing an air-tight seal to the wheel rim and which also holds the tire pressure monitoring assembly in place on the wheel rim.

2. The assembly as recited in claim 1, wherein the flange comprises a buckled and deformed portion of the outer portion of the valve stem, the buckling and deformation being responsive to an axial force applied by tightening the screw into the outer portion.

3. A method of securing a tire pressure monitoring sensor assembly to a wheel rim comprising:
   inserting a valve stem comprising a first portion, which is made from an elastically deformable material, through an opening in the wheel rim whereby the first portion is outside the wheel rim and adjacent to an external surface of the wheel rim, the first portion of the valve stem also having a valve body, which has internal threads, the opening in the wheel rim and the first portion of the valve stem having a clearance fit between them;
   seating a second inner portion of the valve stem against an inner surface of the wheel rim;
   inserting a threaded fastener through a hole in a sensor housing and into the threads in the valve body, such that the threaded fastener holds the sensor housing against the valve stem when the threaded fastener engages the internal threads of the valve body and pulls both the valve body and first portion of the valve stem toward the exterior surface of the wheel rim; and
   rotating the threaded fastener into the valve body until the elastically deformable material is compressed enough to form a flange abutted against the external surface of the wheel rim, the flange circumscribing the first portion of the valve stem.

* * * * *